W. O. MILLIKIN.
NUT LOCK.
APPLICATION FILED NOV. 29, 1912.
1,157,999.
Patented Oct. 26, 1915.
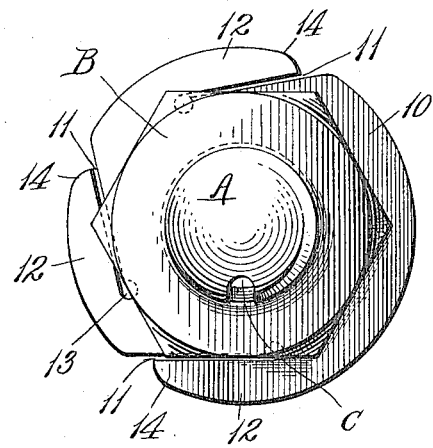
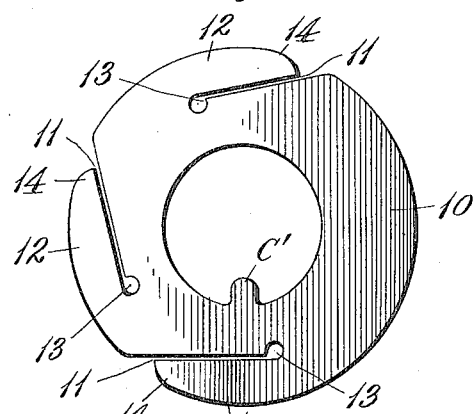
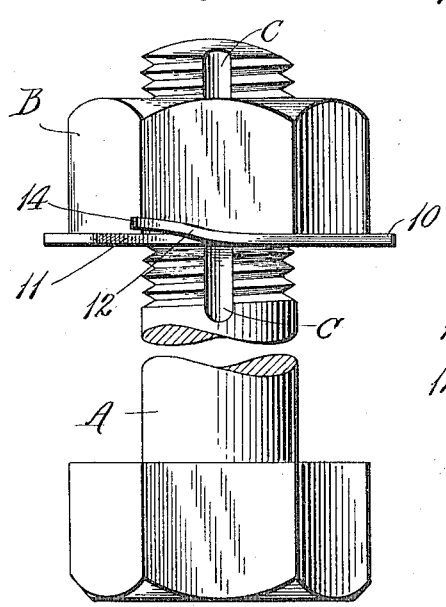
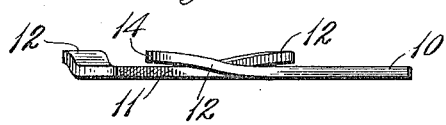
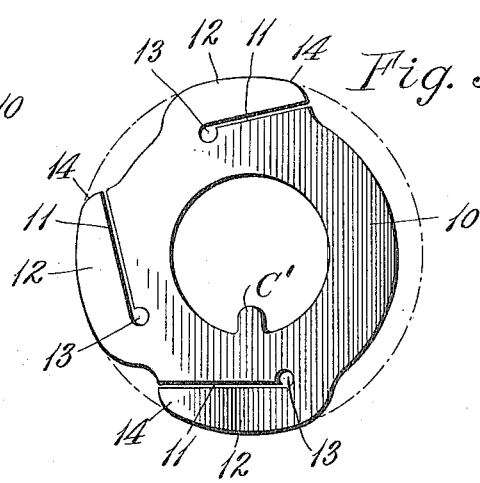
Witnesses
Chas. W. Stauffiger
Anna M. Dorr
Inventor
Winfield O. Millikin,
By
Attorneys

UNITED STATES PATENT OFFICE.

WINFIELD O. MILLIKIN, OF DETROIT, MICHIGAN.

NUT-LOCK.

1,157,999.  Specification of Letters Patent.  Patented Oct. 26, 1915.

Application filed November 29, 1912. Serial No. 734,046.

*To all whom it may concern:*

Be it known that I, WINFIELD O. MILLIKIN, a citizen of the United States of America, residing at Detroit, in the county of Wayne and State of Michigan, have invented certain new and useful Improvements in Nut-Locks, of which the following is a specification, reference being had therein to the accompanying drawings.

This invention relates to improvement in nut locks and more particularly to that class of nut locks in which the locking member is in the form of a sheet metal washer provided with means for engaging and holding the nut against turning.

The object of this invention is to provide an arrangement of the locking devices which is such that one of said devices will engage and hold the nut against retrograde turning whenever the nut is turned a small fraction of a revolution in screwing the nut in place and the other of said devices will lie beneath the nut and put a spring tension thereon at all times to prevent rattling.

A further object of the invention is to so form the locking members that they will yield freely and will present no sharp projecting points when in operative position.

To these ends the invention consists in the matters hereinafter set forth and more particularly pointed out in the appended claim reference being had to the accompanying drawing in which—

Figure 1 is an end elevation of a bolt with a nut in place thereon held by a locking device embodying the invention; Fig. 2 is a side elevation of the same; Fig. 3 is a plan view of the nut lock detached; Fig. 4 is an edge elevation of the same; and Fig. 5 is a view similar to Fig. 3 showing a modified construction.

In the drawing A represents a bolt or the like provided with a screw threaded end to receive the usual hexagonal nut B and the bolt is also formed with a longitudinal groove C in its screwthreaded end adapted to be engaged by a lug or projection C′ formed upon a nut locking washer 10 which is stamped out or otherwise formed from sheet metal with an axial opening to receive the bolt A and with the lug C′ extending into said axial opening to engage the groove C and prevent the washer from turning upon the bolt when placed thereon beneath the nut B. The washer 10 is also formed with a plurality of slits 11 extending tangentially of the washer inward from its outer edge and partially severing portions of the metal therefrom to form a plurality of spring fingers 12. To prevent the metal from splitting or tearing under heavy strain at the inner ends of the slots 11, the metal is pierced at the inner end of each slot so that each slot will terminate in a round hole 13. The sharp end of each spring finger 12 is rounded off as at 14, so that when said fingers are bent upwardly out of the plane of the washer, these fingers will not present sharp points liable to injure the hands of the operator or catch upon things brought into contact therewith.

The spring fingers 12 of the washer which form a series of spring pawls for engaging the faces or sides of the nut are so arranged relative to the faces that but one of the fingers will be in position to engage a face of the nut in any position to which it is turned and the other fingers will lie partially beneath the angles of the nut, one of them being in such a position that a slight further turning of the nut will bring another of the faces in a position to be engaged by it. In the construction shown the nut has six faces and the fingers are so arranged that one of the faces will be brought into position to be engaged by one of the fingers every eighteenth of a revolution. The nut may therefore be turned up closely and firmly locked by one of the fingers. If the nut is formed with a greater or lesser number of faces the spring fingers will be arranged accordingly and one of them engaged with a face of the nut upon a slight turning thereof.

In Fig. 5 the washer is shown as cut away between the fingers to reduce its diameter and make a saving in metal and to also reduce its width so that its spring fingers only will project beyond the angles of the nut.

By spacing the spring fingers relatively to the face of the nut as described, a slight turn of the nut brings one of said fingers into locking engagement with the nut and the other fingers of the series are compressed beneath the nut so that it will be held from rattling by the spring action of the fingers if it or the bolt becomes slightly loose by reason of the embedding of the head of the bolt in the member through which it passes or the wearing away of the parts.

Obviously, changes may be made in the construction and arrangement of parts without departing from the spirit of my invention as defined by the claim and I do not limit myself to the particular form shown.

Having thus fully described my invention what I claim is:—

The combination with a threaded bolt, of a polygonal nut engaging the bolt and a washer having a central aperture with means interlocking with the bolt, the washer being formed with slits extending inwardly from the periphery in lines that are chords of the circumference, the slits being enlarged at their inner ends within the area outlined by said slits, the ends of the resultant fingers being severally cut-away to lie well within this circumference and offset from the face of the washer contiguous to the nut whereby the inner marginal portion of each finger may be brought into abutting relation with an adjacent facet of the nut.

In testimony whereof I affix my signature in presence of two witnesses.

WINFIELD O. MILLIKIN.

Witnesses:
ANNA M. DORR,
GENEVIEVE E. McGRANN.

Copies of this patent may be obtained for five cents each, by addressing the "Commissioner of Patents, Washington, D. C."